United States Patent [19]

Berlin et al.

[11] 4,403,756
[45] Sep. 13, 1983

[54] BIFURCATED FEEL SIMULATOR FOR AIRCRAFT

[75] Inventors: J. Burton Berlin, Mercer Island; Erwin V. Schweizer, Kent, both of Wash.

[73] Assignee: The Boeing Company, Seattle, Wash.

[21] Appl. No.: 218,469

[22] Filed: Dec. 22, 1980

[51] Int. Cl.³ .............................................. B64C 13/46
[52] U.S. Cl. .................... 244/223; 244/75 R; 244/229; 244/226; 74/479
[58] Field of Search ............... 244/223, 229, 226, 230, 244/220, 221, 75 R, 78; 74/469, 479; 434/35; 92/150, 151

[56] References Cited

U.S. PATENT DOCUMENTS

| | | | |
|---|---|---|---|
| 1,817,204 | 8/1931 | Petersen | 244/84 |
| 1,844,607 | 2/1932 | Sikorsky | 244/84 |
| 2,166,241 | 7/1939 | De Wouters d'Oplinter | 244/84 |
| 2,511,446 | 6/1950 | Scheer | 244/84 |
| 2,528,752 | 11/1950 | Jacobus | 244/83 |
| 2,772,841 | 12/1956 | Bonsteel | 244/223 |
| 3,058,701 | 10/1962 | Wray et al. | 244/83 |
| 3,286,958 | 11/1966 | Moran | 244/84 |
| 3,395,878 | 8/1968 | Westbury | 244/83 |
| 3,405,892 | 10/1968 | DiCamillo | 244/223 |
| 3,611,828 | 10/1971 | Maroshick | 244/84 |
| 3,733,039 | 5/1973 | O'Connor et al. | 244/83 |
| 3,747,876 | 7/1973 | Fortna et al. | 244/83 |
| 3,790,108 | 2/1974 | Bock | 244/223 |
| 3,949,958 | 4/1976 | Richter | 244/227 |

FOREIGN PATENT DOCUMENTS

| | | | |
|---|---|---|---|
| 2712449 | 9/1978 | Fed. Rep. of Germany | 92/151 |
| 1505870 | 12/1966 | France | 244/83 |
| 663269 | 2/1950 | United Kingdom | 244/83 |

Primary Examiner—Galen L. Barefoot
Attorney, Agent, or Firm—Christensen, O'Connor, Johnson & Kindness

[57] ABSTRACT

A bifurcated feel unit for use in a dual path flight control system includes separate input levers for the pilot and copilot control paths. The input levers pivot about a common axis but are capable of independent rotation upon override of the breakout pogos associated with the control system external to the feel unit. Each input lever is coupled to a source of resistive force, preferably a piston within a hydraulic chamber. Normally the feel force supplied is the sum of the resistive forces applied to each input lever. In the event of a jam in one path of the flight control system, the feel force supplied to the remaining operable path is reduced in proportion to the reduction in available control surface.

3 Claims, 3 Drawing Figures

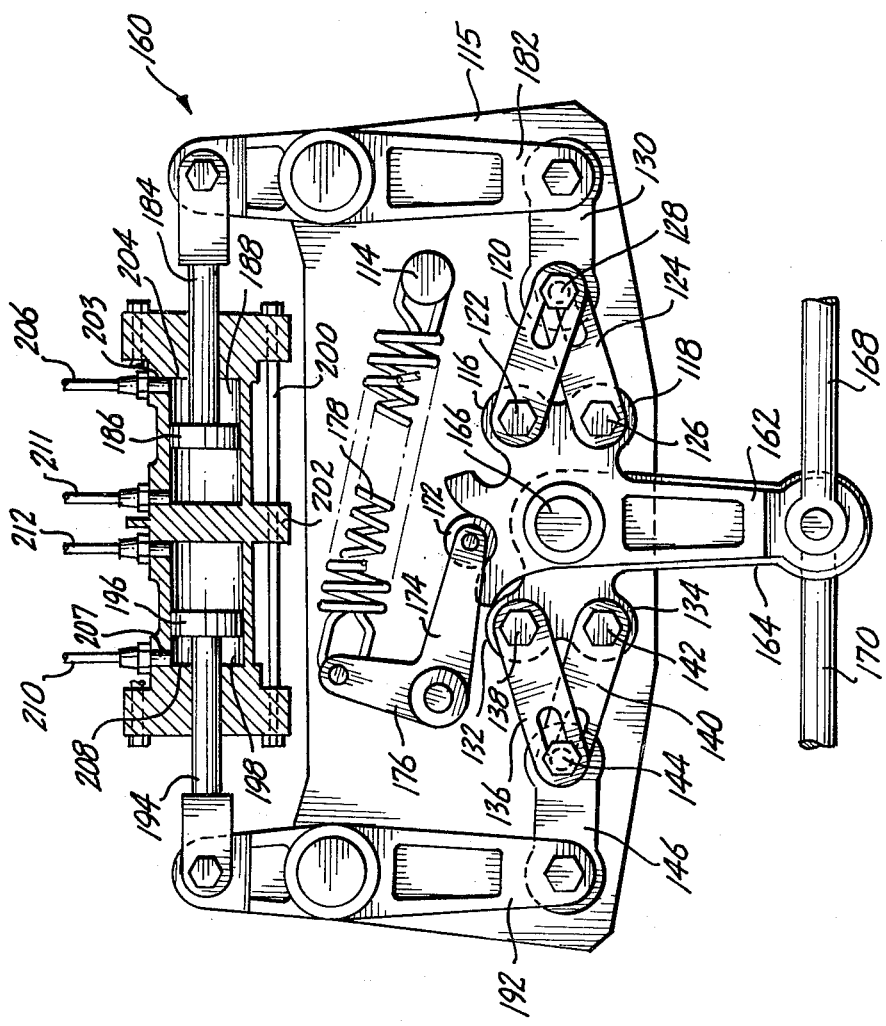

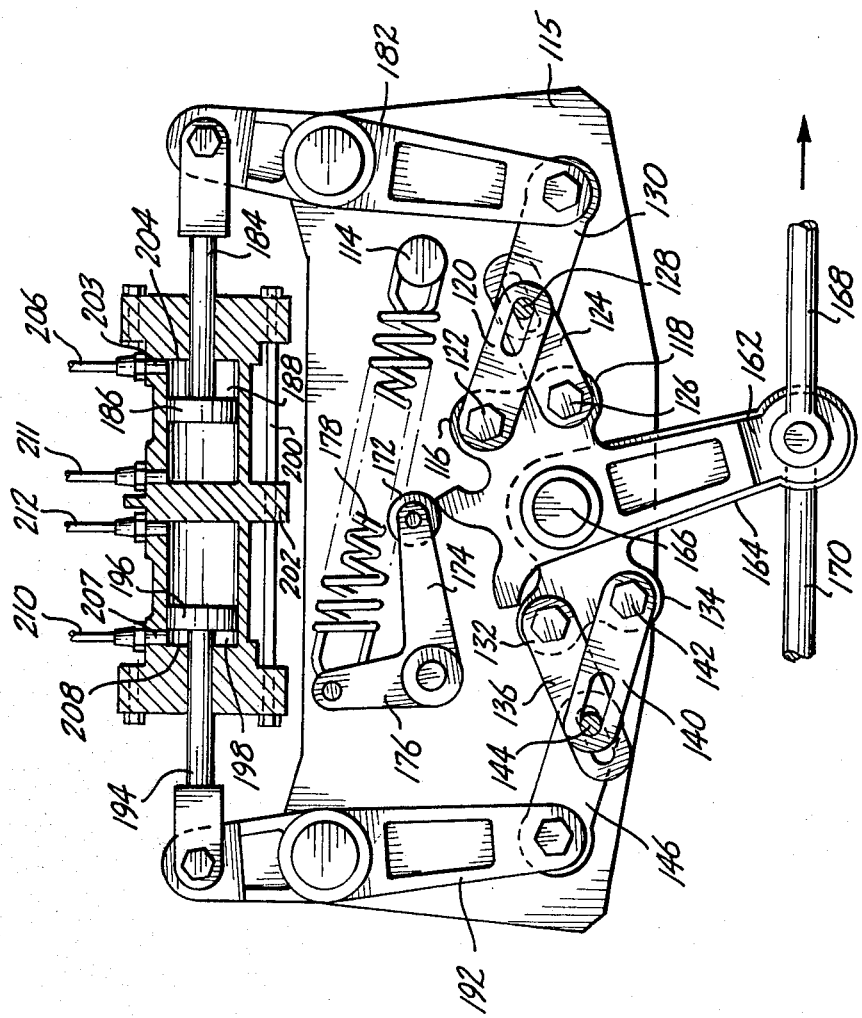

BIFURCATED FEEL SIMULATOR FOR AIRCRAFT

BACKGROUND OF THE INVENTION

This invention relates to flight control mechanisms for aircraft and, more particularly, relates to a bifurcated feel system for use in an aircraft having a dual path flight control system.

In order to provide stable control of an aircraft in flight it is desirable that the pilot receive a force feedback from the control surfaces which indicates the response of the aircraft to flight controls. In small aircraft force feedback can be accomplished by connecting the pilot controls directly to the aerodynamic control surfaces so that the aerodynamic forces on the control surfaces feed directly back to the pilot. However, as airplanes have gotten larger, the forces that can be applied manually by a pilot are insufficient to adequately control the aircraft and, in some cases, even to move the control surfaces. It has, therefore, become routine for the control surfaces of the aircraft to be hydraulically controlled. When the control surfaces are moved by a powered system the aerodynamic forces or "feel" previously fed back to the pilot to indicate his control of the aircraft are lost and an artificial feedback force proportional to the aerodynamic forces acting on the control surfces must be provided to enable the pilot to "feel" the action of the control surfaces. If such artificial feel were not incorporated there would be a tendency for the pilot to overcontrol, resulting in unstable flight patterns and possibly destructive conditions.

As a requirement of safety it is generally required that the flight controls be duplicated and arranged to provide dual control paths to provide for control by both the pilot and the copilot. The controls are arranged so that in the event of a failure in either of the control paths the operator of the controls in the remaining path can override the failed controls and individually fly the airplane. Since the flight control system is dual path it is necessary that feel simulation be provided to each of the control paths. In many presently used control systems a single artificial feel unit provides feel for both the pilot and copilot control paths. In certain prior art flight control systems the mechanical control paths of the pilot and copilot are directly tied together and then directly tied to the feel unit. In such a system a mechanical failure or jam in either the pilot's or copilot's control path renders the entire aircraft control system inoperative. In order to satisfy safety requirements on new aircraft, override devices are generally now provided between the pilot's and copilot's control circuits so that a failure in one or the other control circuit can be overridden by the remaining pilot and the plane can be flown on the remaining operative control system.

Even with the override systems installed, certain disadvantages remain in a flight control system having a single conventional feel unit. It is necessary that the feel unit be directly connected to only one of the control paths, for example, the pilot's. Therefore, the copilot receives feel simulation by way of the override devices coupling the copilot's control path to the pilot's control path. Since the copilot applies force to the feel system only through the overrides, the breakout force of the overrides must be very high in order to prevent inadvertent breakout during normal operations from the copilot's side. Therefore, very high copilot breakout control forces result from a jam of the pilot's control circuit. This is an undesirable condition since breakout forces should be as low as possible to provide an easily controlled aircraft. Also, in the system described above, if the copilot's control path jams the pilot must apply the high breakout force added to the full feel force for control of the control surface. The pilot's and copilot's jammed override control forces therefore are dissimilar. The disparity in override control forces is undesirable from a training standpoint since it requires variations in training between the copilot and pilot and retraining when those roles are reversed.

The problems mentioned above have been somewhat alleviated by arrangements in which separate feel units are provided for the pilot and the copilot. Such a system is symmetrical and has reasonable jam breakout forces but such a system has the undesirable feature of increasing weight of the aircraft and also the cost, since two complete feel generating systems must be installed. Also, having two feel units in the system adds friction to the control system. The control surfaces of the aircraft are very susceptible to friction, particularly the elevator system. Also, there is a problem of synchronizing the rigging of the duplicate control systems.

It is therefore an object of the present invention to provide a single feel unit which will simultaneously provide control surface feedback or "feel" to both the pilot and copilot control paths of a dual path aircraft control system.

It is a further object of the present invention to provide such a feel unit which introduces substantially the same amount of friction into the system as would be introduced by a single feel unit attached to only the pilot control system.

It is an object of the present invention to provide a feel unit which simultaneously provides feel to both the pilot and copilot control systems and can be operated with relatively equal and reasonable jam breakout forces for each control path.

SUMMARY OF THE INVENTION

In furtherance of the above-stated objects a bifurcated feel unit is provided for use in a dual path flight control system for an aircraft. The feel unit includes individually operable input levers connected respectively to the pilot and copilot control sticks. The input levers are normally operated in unison and are tied together by mechanical linkages within the flight control system external to the feel unit. In the event of a jam occurring in either the copilot or pilot's control path the remaining free-moving control path can be operated after overriding breakouts which connect the two control paths to individually operate the control input lever associated with the operable portion of the flight control system. The bifurcated feel unit is arranged so that upon loss of input from one side of the dual flight control path the feel force provided to the flight control system is cut in half, which is desirable since it coincides with a loss of one-half of the control surface operation so that the feel force remaining in the system is still proportional to the aerodynamic forces on the remaining operative control surfaces.

BRIEF DESCRIPTION OF THE DRAWINGS

The principles and operation of the present invention will be better understood by those of ordinary skill in the art and others upon reading the ensuing specification taken in conjunction with the attached drawings wherein:

FIG. 2 is an elevational view of a feel unit made in accordance with the principles of the present invention.

FIG. 3 is an elevational view of the feel unit of FIG. 2 with an input force applied from the pilot's control stick.

DETAILED DESCRIPTION OF THE PREFERRED EMBODIMENT

Figure 1:
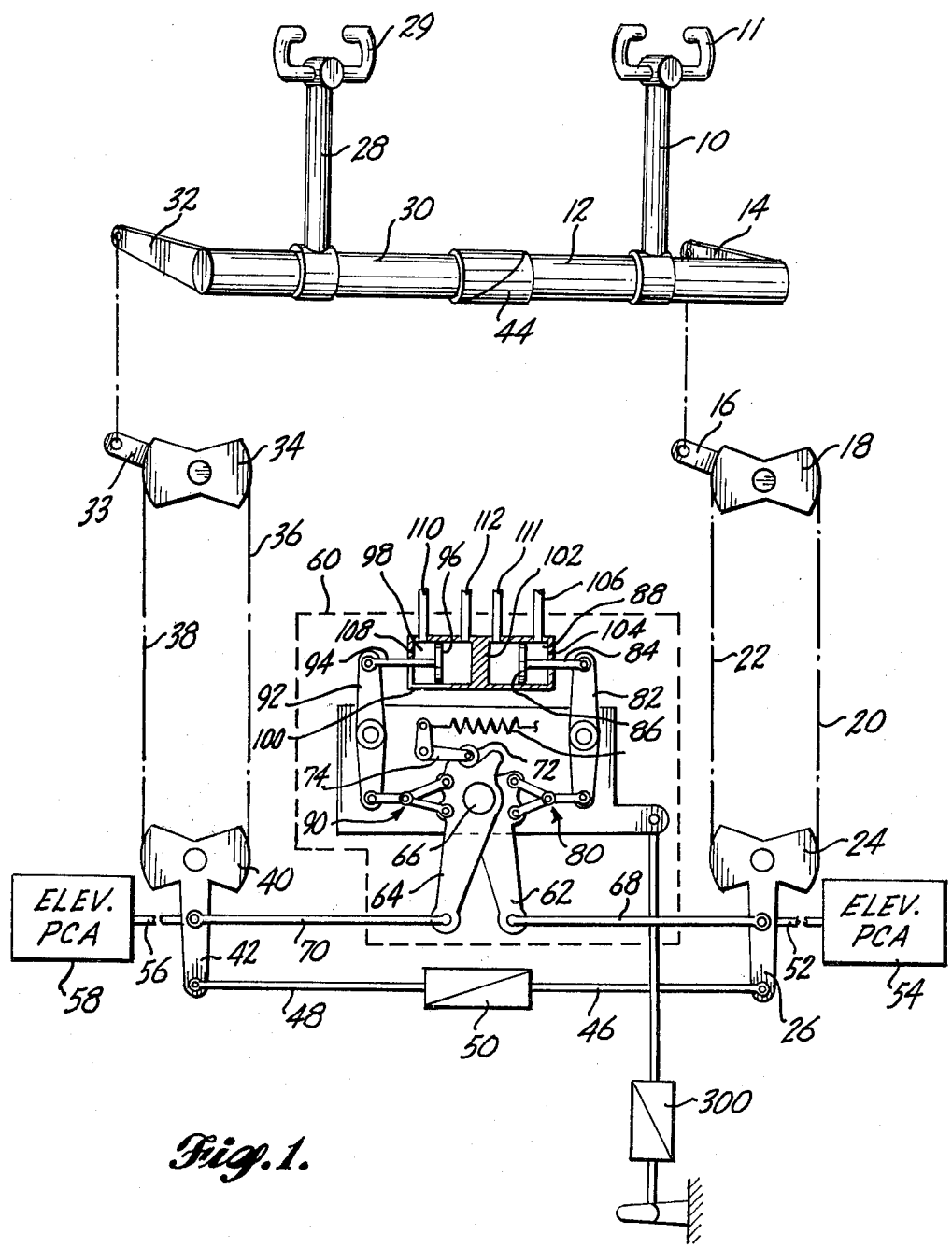
FIG. 1 is a schematic diagram of a dual path flight control system incorporating a bifurcated feel unit made in accordance with the principles of the present invention.

Referring now to FIG. 1, a flight control system for controlling the elevators of an aircraft is shown in schematic diagram. While the feel unit of the present invention can be utilized in conjunction with any of the control surfaces of the aircraft, it will be described herein in conjunction with the control of the elevators of an aircraft. The elevator control surfaces are most critical in their sensitivity to angular position of the control surfaces and the provision of artificial feel in the elevator control system is most important. Therefore, the present invention will be described in conjunction with the elevator control system. In the control system of FIG. 1 a control column 10 which, for purposes of example only, we will define as the pilot's control column, is rigidly mounted to a first torque tube 12 having a first control arm 14 rigidly affixed to a first end thereof. A second end of the control arm 14 is mechanically coupled to a second control arm 16 which is rigidly coupled to a first flight control quadrant 18. The flight control quadrant 18 is mechanically linked by cables or other suitable means indicated by phantom lines 20 and 22 to a second flight control quadrant 24 having a first extension arm 26 extending therefrom.

A second control column 28 is rigidly coupled to a second torque tube 30. For purposes of the present specification control column 28 will be referred to as the copilot's control column. Each of the control columns 10 and 28 has a suitable handgrip means 11 and 29, respectively, affixed thereto to provide a grip which the pilot and copilot can conveniently hold onto when operating their respective control columns. The second torque tube 30 has a third control arm 32 rigidly coupled to a first end thereof, the third control arm 32 being mechanically coupled to a fourth control arm 33 which in turn is rigidly coupled to a third flight control quadrant 34. The third flight control quadrant 34 is coupled by cables or other suitable mechanical means as indicated by phantom lines 36 and 38 to a fourth flight control quadrant 40. A second extension arm 42 extends from and is rigidly attached to the fourth flight control quadrant 40. The first and second torque tubes 12 and 30 are coupled at their respective second ends through an override or breakout pogo 44 which can be any suitable conventional breakout pogo. During normal, unjammed operation of the fifth control system, the pogo 44 couples the torque tubes 12 and 30 together so that movement of the control column 10 will result in corresponding movement of the control column 28 and vice versa. The coupling arrangement between torque tubes 12 and 30 provides that either the pilot or copilot by movement of his respective control column can effectuate movement of all of the flight control quadrants 18, 24, 34, 40 simultaneously.

The first extension arm 26 of the second flight control quadrant 24 has a first rod 46 affixed to one end thereof. Similarly, the second extension arm 42 from the fourth control quadrant 40 has a second rod 48 attached thereto. The rods 48 and 46 in turn are coupled through a second breakout pogo 50 which, again, can be any suitable conventional breakout pogo. During normal, unjammed operation of the flight control system, the second breakout pogo 50 provides a second coupling between the two paths of the dual path flight control system and, in normal operation, rigidly couples the rods 48 and 46 to one another to permit simultaneous movement of control quadrants 24 and 40 through the action of either the control column 10 or 28. The extension arm 26 is also coupled through a suitable control mechanism indicated by rod 52 to the hydraulic controls of one of the aircraft's elevators such that movement of the control quadrant 24, which results in corresponding movement of the extension 26 will effect angular displacement of the associated elevator. The elevator hydraulic controls do not form part of the present invention and are of conventional design and are therefore merely indicated by block 54. Similarly, the second extension arm 42 of the fourth flight control quadrant 40 is affixed through suitable linkage indicated by rod 56 to the hydraulic controls, indicated by block 58, associated with the other elevator of the aircraft to effectuate angular movement of the second elevator of the aircraft.

Due to the coupling between the right and left halves of the dual path control system shown in FIG. 1, it is clear that movement of either the pilot's control column 10 or copilot's control column 28 will result in control signals being directed to the respective hydraulic controls associated with each of the aircraft elevators in a conventional manner. The pogos 44 and 50 act in a conventional manner to permit operation of one side of the dual path control system in the event of a jam in the other side; for example, a binding of the pivot of first control quadrant 18 which prevents the control quadrant 18 from moving. Any attempt to move that quadrant by the pilot will meet the resistance. Movement of the control column 28 by the copilot will also result in resistance to movement due to the coupling between the control column 28 and flight control quadrant 18 through pogo 44. However, the pogo 44 has a breakout point such that upon sufficient exertion of force by the copilot on the control column 28, the pogo 44 will uncouple the torque tubes 12 and 30, permitting movement of the control column 28 and torque tube 30 while the torque tube 12 remains stationary. Movement of the control column 28 will tend to produce movement of the control quadrants 34 and 40, however, those quadrants being coupled through pogo 50 to the control quadrants 18 and 24 will meet with resistance to movement because of the jam which is binding control quadrant 18. Upon sufficient force being applied to the pogo 50 by control quadrant 40 the pogo 50 will also break out and uncouple the rod 48 from the rod 46, thereby permitting movement of the control quadrants 34 and 40 independent of control quadrants 18 and 24 such that angular movement of one elevator of the aircraft will be effected by the control signals sent to elevator hydraulic controls 58. A jam in the control path associated directly with the copilot control column 28 would produce similar results in that the pogos would permit movement of the pilot's side of the dual path control system to effectuate movement of the elevator of the aircraft which is tied to elevator hydraulic controls 54 in the same manner as described above. The flight control mechanisms described thus far are conventional and well-known to those persons of ordinary skill in the design and construction of flight controls for aircraft.

A feel unit 60 is provided in the flight control circuit of FIG. 1 to provide a feedback force which resists movement of the control columns 10 and 28. The feedback force of feel is proportional to the aerodynamic forces exerted on the control surfaces, in this case the elevators occasioned by such movement of the control columns. Provision of this feedback force or feel gives the pilot a better indication of the effect of control column movement on the control surfaces and provides more stable operation of the control surfaces and tends to prevent overcontrol which may result in destructive forces being applied to the control surfaces and even the aircraft itself. The feel unit 60, which is made in accordance with the principles of the present invention, includes a pilot input lever 62 and a copilot's input lever 64 which are pivotally movable about a concurrent pivot axis 66 but are movable independently of one another about that pivot axis. The pilot's input lever 62 has pivotally coupled thereto at a first end thereof a first end of a rigid push rod 68. The second end of the push rod 68 is pivotally coupled to the first extension arm 26 intermediate the pivot point of second flight control quadrant 24 and the attachment point of the rod 46. Similarly, the copilot's input lever 64 at a first end thereof has a first end of a second push rod 70 pivotally attached thereto, the second end of push rod 70 is pivotally affixed to the second extension arm 42 intermediate the pivot point of fourth flight control quadrant 40 and the attachment point of rod 48 to the second extension arm 42. It should be noted that the pilot and copilot input levers 62 and 64 respectively are shown in FIG. 1 with their first ends spaced from one another. As will be discussed below, the preferred embodiment of the bifurcated feel unit of the present invention provides that the pilot and copilot input levers should be in register with one another during normal operation, i.e., unjammed operation, and the configuration of FIG. 1 which provides a separation between the input lever position is for purposes of illustration only. The push rods 68 and 70 rigidly couple the input levers 62 and 64 respectively to the control quadrants 24 and 40 so that movement of the control quadrants in response to control column movement by the pilot or copilot will result in simultaneous movement of the input levers. A roller 72 rests in a detent formed in the second end of the control input lever 64. The roller is rotatably mounted on a lever arm 74 which is in turn pivotally mounted to a link 76 coupled at one end thereof to a centering spring 78. The second end of the centering spring 78 is affixed to the housing of feel unit 60. Centering spring 78 provides a bias force which maintains the roller 72 in the detent in the input lever to provide a center point for the input levers when the control system is in a static mode and also provides a small breakout force which must be overcome by the pilot or copilot in order to initiate movement of the control column in a conventional manner. Typically, the centering spring is of a sufficient strength to exert a force of three to four pounds at the control columns 10 and 28. The pilot input lever 62 is coupled through a first fork linkage 80 to a first end of a right crank arm 82 pivotally mounted on the feel unit housing. A second end of the right crank arm 82 is pivotally mounted to an actuator rod 84 which is affixed to a piston 86 slidably and sealable mounted within a hydraulic chamber 88. The copilot input lever 64 is attached through a second fork linkage 90 to a first end of a left crank arm 92 which is pivotally mounted on the feel unit housing. The second end of the left crank arm 92 is pivotally attached to an actuator rod 94 which in turn is affixed to a piston 96 slidably and sealably mounted within a hydraulic chamber 98. The hydraulic chambers 88 and 98 are formed within a hydraulic cylinder 100 which has an axial bore formed therein, the bore being divided by a wall 102 to form the first and second hydraulic chambers 88 and 89 respectively.

The hydraulic cylinder 100 has a first input port formed in the wall thereof intermediate the piston 86 and a first end wall 104 of the cylinder. A first input conduit 106 provides hydraulic fluid under pressure to hydraulic chamber 88 through the first input port. Similarly, a second input port is formed in the wall of the hydraulic cylinder 100 intermediate the second piston 96 and a second end wall 108. A second input conduit 110 is coupled to the second input port to provide hydraulic fluid under pressure to the second chamber 98. The hydraulic fluid within conduits 106 and 110 is provided from separate hydraulic systems under the control of separate flight computers which receive air speed, mach number and airplane configuration data, such as that related to center of gravity, to provide variable hydraulic pressure to the chambers 88 and 98 proportional to the aerodynamic forces being experienced by the control surfaces; in this case, the elevators of the aircraft.

As will be discussed in greater detail below, movement of the either control column 10 or 28 to effect angular displacement of the control surfaces results in the movement of input levers 62 and 64 of the feel unit 60. The movement of the input levers results in movement of crank arms 82 and 92 such that the second ends of the crank arms move in a direction away from the cylinder 100, thereby tending to move the pistons 86 and 96 against the force exerted by the hydraulic fluid in hydraulic chambers 88 and 98, respectively. The resistance of the hydraulic fluid in the chambers 88 and 98 provides the feedback resistive force or "feel" to the flight control system.

A first return port is formed in the hydraulic cylinder 100 intermediate the wall 102 and the piston 86 and, likewise, a second return port is formed in the cylinder 100 intermediate the wall 102 and the piston 96. The return ports are each coupled through suitable return conduits 111 and 112 respectively to the hydraulic fluid reservoir of the systems which provide hydraulic fluid to the feel unit so that as the pistons 86 and 96 move within the chambers any pressure in the space between the pistons and the center wall 102 is relieved through the return ports to maintain those spaces in substantially unpressurized conditions.

Referring now to FIG. 2, a preferred embodiment of a bifurcated feel unit made in accordance with the principles of the present invention is shown in detail. The pilot input lever 162 directly overlies the copilot input lever 164 during the normal operation of the feel unit when there are no jams in either side of the dual path flight control system. A push rod 168 is attached at a first end thereof to the pilot control lever 162 and a second push rod 170 is attached at a first end thereof to one end of the copilot input lever 164. A centering spring 178 is affixed at a first end thereof to a stud 114 extending from a back plate 115 of the feel unit. A second end of the centering spring 178 is pivotally attached to a connecting link 176 which in turn is pivotally attached to a first end of a bias arm 174. A roller 172 is rotatably mounted on a second end of the bias arm 174. The roller 172 rests in a detent formed in the upper edge of the pilot input input lever 162 when the input levers are in their center position, as shown in FIG. 2. The pilot and copilot input levers rotate about a pivot axis 166 and can rotate independently of one another. A pair of ears 116 and 118 extend from the right side, as viewed in FIG. 2, of the pilot input lever 162. The ears 116 and 118 are substantially semicircular and are offset above and below, respectively, the pivot axis 166. A first upper control link 120 is pivotally attached at a first end thereof to the ear 116 by means of a pivot pin 122. A first lower control link 124 is pivotally attached at a first end thereof to the ear 118 by means of a pivot pin 126. Longitudinal slots are formed adjacent the second ends of each of the first upper and first lower control links 120 and 124 and the second ends of the first upper and first lower control links 120 and 124 are pivotally coupled to one another by means of a pivot pin 128 passing through the slots. The second ends of the first upper and first lower control links are also pivotally coupled by means of the pivot pin 128 to the first end of a first idler link 130. The second end of the first idler link 130 is pivotally attached to a first end of a right crank arm 182, a second end of the right crank arm 182 is pivotally attached to a first actuator rod 184. The right crank arm 182 is pivotally mounted to the back plate 115 at a point intermediate the first and second ends of the crank arm.

A second pair of ears 132 and 134, respectively, are formed on the left side, as viewed in FIG. 2, of the copilot input lever 164. The ears 132 and 134 are offset above and below, respectively, the pivot axis 166. A first end of a second upper control link 136 is pivotally attached to the ear 132 by means of a pivot pin 138. A first end of a second lower control link 140 is pivotally attached to the second ear 134 by means of a pivot pin 142. Longitudinal slots are formed in each of the second upper and second lower control links adjacent the second ends thereof and the second ends of the second upper and second lower control links are pivotally affixed to one another by a pivot pin 144 which passes through the slots. The second ends of the second upper and second lower control links are also pivotally attached to a first end of a second idler link 146. The second end of the second idler link 146 is pivotally attached to a left crank arm 192. The second end of the left crank arm 192 is pivotally attached to a first end of a second actuator rod 194. The left crank arm 192 is pivotally affixed to the back plate 115 at a point intermediate the first and second ends of the left crank arm. The right crank arm 182 and the left crank arm 192 are substantially parallel to one another.

The second end of the actuator rod 184 is affixed to a first piston 186 slidably mounted within a first bore 188 formed axially in a hydraulic cylinder 200. The second end of the second actuator rod 194 is affixed to a second piston 196 slidably mounted within a second bore 198 formed coaxially with the first bore 188 within the hydraulic cylinder 200. The bores 188 and 198 are separated by a wall 202 which lies perpendicular to the longitudinal axis of the hydraulic cylinder 200 substantially in the center of the hydraulic cylinder. Both pistons 186 and 196 are sealably mounted within their respective bores to prevent fluid flow around the pistons. A first input port 203 is formed in the wall of hydraulic cylinder 200 adjacent a first end wall 204. The input port 203 opens into the first bore 188 and is coupled to an input conduit 206 to permit hydraulic fluid to pressurize the portion of the first bore 188 between end wall 204 and piston 186. Similarly, a second input port 207 is formed in the wall of hydraulic cylinder 200 substantially adjacent a second end wall 208. The second input port 207 opens into the second bore 198 and is coupled to a second input conduit 210 to permit hydraulic fluid to enter the portion of the second bore 198 between second end wall 208 and piston 196.

The conduits 206 and 210 are connected to sources of hydraulic pressure which are controlled by flight computers as described above to produce hydraulic pressures within bores 188 and 198 in proportion to the aerodynamic forces occurring on the control surfaces. In FIG. 2 the bifurcated feel unit is shown with the pilot and copilot input levers 162 and 164 in the center position with no elevator movement being initiated by the pilot or copilot. In this condition the pistons 186 and 196 are acted upon by the fluid within the bores which tends to move the pistons toward the center wall 202. The force of the fluid on the pistons is translated through the actuator rods 184 and 194 to the respective second ends of the crank arms 182 and 192, tending to rotate the crank arm 182 in a counterclockwise direction as viewed in FIG. 2 and tending to rotate the crank 192 in a clockwise direction as viewed in FIG. 2. The rotational tendency on the crank arms 182 and 192 is translated through the crank arms and the idler links 130 and 146 to tend to move the respective first ends of the crank 182 and 192 outwardly from the pilot and copilot input levers, thereby loading the upper and lower control links of the first and second pairs of control links, moving pivot pins 128 and 144 to their extreme outboard positions at the end of the longitudinal slots formed in the control links.

FIG. 3 illustrates a condition in which the pilot input lever and copilot input levers are rotated counterclockwise, i.e., the lower or first ends of the input levers are moved to the right as illustrated. The pivotal movement of the input levers is caused by a movement of the pilot or copilot control column, as illustrated in FIG. 1 and discussed above. Since the pilot and copilot control columns are coupled together to provide a dual path control system, the input levers 162 and 164 move in the same direction and in unison, regardless of whether the movement is initiated by the pilot or the copilot. In the configuration illustrated, the movement of the input levers has caused the detent in the upper end of the pilot's input lever to move away from roller 172 and the roller 172 has ridden up the cam surface formed on the upper edge of the pilot control lever to the location pictured. The centering spring 178 continues to exert a centering force on the pilot and copilot input levers throughout the full travel of the levers. The force exerted on the pilot input lever 162 is transmitted through the lever to the upper ear 116 and the lower ear 118. The force is further transmitted through the upper ear 116 to the first upper control link 120 and through the lower ear to lower control link 124. The upper control link translates the force to the pivot pin 128 and thereby to the first idler link 130 as an extension force. The lower ear transmits the force through the lower control link 124 to the pivot pin as a compression force. Due to the slotted configuration of the second ends of upper and lower control links 120 and 124 substantially all the extension force is transmitted but little of the compression force is transmitted so that the lower control link is substantially unloaded in this orientation and the pivot pin connection between link 120 and idler link 130 is moved with relation to the slot in lower control link 124 to a position toward the ear 118. The force from the pilot input lever is therefore exerted on the first end of the right crank arm 182 through the upper control link and the idler link.

The force applied to copilot input lever 164 is translated to the ears 132 and 134 of the copilot input lever. The force is transmitted as compression force is applied to the upper control link 136 and as an extension force to the lower control link 140. The slotted configuration of the upper control link 136 permits the pivot pin 144 to translate inwardly and upwardly in the slot, thereby permitting only a slight amount of the compression force from the upper control link 136 to be transmitted to the pivot pin 144. Substantially all of the extension force exerted by lower control link 140 is transmitted to the pivot pin 144 and the force from pivot pin 144 is transmitted to the second crank arm 192 through second idler link 146, tending to move the second crank arm in a counterclockwise direction. While the lower control link 140 and the idler link 146 are in substantially aligned orientation during the counterclockwise movement of the copilot control lever 164, the upper control link 136 becomes unloaded and merely translates along the slot and pivot pin arrangement to the position illustrated.

The clockwise movement of crank arm 182 and counterclockwise movement of crank arm 192 is resisted by the pressure within the bores 188 and 198 respectively, due to the presence in the bores of the pressurized hydraulic fluid fed to the bores from the flight computer controlled hydraulic system. The resistive force of the fluid is proportional to the pressure of the fluid, which pressure is in turn proportional to the aerodynamic forces exerted on the control surfaces which are being moved by the pilot or copilot. Therefore, the resistive force provided by the feel unit to movement of the pilot and copilot input levers is transmitted back through the dual path flight control system to the pilot and copilot control columns. Since the resistive force is proportional to the aerodynamic forces experienced on the control surfaces being moved, the resistive force provides a feedback to the pilot or copilot indicating the degree of control which he is exerting over the control surfaces, allowing him a better feel for how to move those surfaces to control the flight path of the aircraft.

Up to this point of operation the action of the bifurcated feel unit 160 is not substantially different than the action of a single conventional feel unit. However, upon a jam occurring in either the copilot's or pilot's flight control path, the novel features of the bifurcated feel unit of the present invention are most notable. For example, in the case of a jam occurring in the copilot's control path and an attempted movement of the pilot's control column to obtain movement of the pilot input arm 162 identical to that shown in FIG. 3, the jam in the copilot's control path would prevent movement of the copilot input lever 164. Since the pilot and copilot levers are completely independent of one another in their mounting about pivot axis 166, the pilot input lever 162 would continue to be movable about the pivot axis upon breakout of the pilot's controls through the pogos in the system. Therefore, the force transfers as explained above in relation to the pilot input lever 162 would be the same as described and a rotation of the first crank arm 182 in a clockwise direction would be accomplished with its attendant resistive force exerted by the pessure in bore 188. Since copilot input lever 164 would be stationary, no resistive force would be provided by the fluid within the second bore 198 and the feel force provided by the feel unit to the pilot control column would be substantially one-half what it would be if there were no jam in the copilot control path.

At the same time, the jam in the copilot control path would prevent movement of the left elevator, as pictured in FIG. 1, which is directly coupled to the copilot control path and is uncoupled by the operation of the breakout pogos as was explained earlier. Therefore, the total control surface, in this case the elevator surface, which is being utilized and moved by the pilot is only substantially one-half of the control surface which would be moved if there were no jams in the system. Therefore, the feel feedback force or resistive feedback force on the pilot control stick is still proportional to the aerodynamic forces on the control surfaces, since both the control surface area and the feedback force have been halved by the jam. A similar situation would occur if the jam were in the pilot's side. In such a circumstance the copilot would be controlling only the left elevator while the right elevator remains stationary and, likewise, the movement of the copilot input lever 164 would be as described above for an unjammed system and would provide one-half the normal feel force. The pilot input lever 162 would remain stationary and would offer no addition to the feel force.

A problem could be encountered during flight in which a single point jam could jam the feel force actuator cylinder 200, thereby jamming simultaneously both sides of the feel unit 160, rendering it inoperative. Several solutions are possible to provide breakout for such a jam, one of which is illustrated in FIG. 1. In FIG. 1 the back plate of the feel unit 60 is not rigidly mounted to structure but rather is mounted through a third breakout pogo 300. In the case of a jam in the feel unit actuator itself, control of the elevators could still be accomplished by exerting a force sufficient to override the breakout pogo 300 such that input levers 62 and 64, rather than moving actuator pistons 86 and 96, would actually result in movement of the entire feel unit back plate. A typical value for the breakout force necessary to override breakout pogo 300 is in the neighborhood of seventy pounds.

In summary therefore, a bifurcated feel unit for use in a dual path flight control system to provide a feedback or resistive force proportional to the aerodynamic forces occurring on the control surfaces during movement of the control surfaces is provided. The bifurcated feel unit includes separate input levers for the pilot and copilot controls, the input levers pivoting about a common pivot axis but being capable of entirely independent rotation. Each input lever is coupled to the piston of a feel force actuator which provides the actual resistive force to the system. In a preferred embodiment, the two feel force actuators are integrally formed in a single cylinder body. In normal operation the feel force provided to the flight control system is the sum of the forces provided by each of the feel force actuators. In the event of a jam of one side of the dual path flight control system, the feel force provided to the remaining operable half of the system is reduced by an amount proportional to the reduction in the effective amount of control surface which can be controlled by the remaining operable control system. While a preferred embodiment of the bifurcated feel unit of the present invention has been illustrated and described herein, it will be apparent to those of ordinary skill in the art and others that changes can be made to the illustrated embodiment while remaining within the spirit and scope of the present invention. Therefore, the present invention is to be defined solely with reference to the claims which follow.

The embodiments of the invention in which an exclusive property or privilege is claimed are defined as follows:

1. In a dual path flight control system having separate control paths linking the control surfaces of an aircraft to each of a pilot control stick and a copilot control stick, the improvement comprising a single feel unit coupled to both paths of said control system, said feel unit including:
   a first lever constructed and arranged for pivotal movement about a first axis said first lever being coupled to and driven by said pilot control stick;
   a second lever constructed and arranged for pivotal movement about said axis, said second lever coupled to and driven by said copilot control stick;
   a feel load-generating means for producing a feel force representative of the aerodynamic forces acting on the aircraft control surfaces; and,
   linkage means associated with said first and second levers and said feel load-generating means for coupling said first and second levers to said feel load-generating means such that said feel force opposes motion of said levers and such that said feel load-generating means is operable in the event of a jam in one path of said dual path system which jam renders inoperative a portion of the control surfaces of the aircraft to provide feel force to the other path of the dual path system that is representative of the aerodynamic forces acting on the remaining operative portion of the control surfaces.

2. The improvement of claim 1 wherein said first and second levers and said linkage means are constructed and arranged in such a manner that in an unjammed condition of the dual path control system, movement of either the pilot or copilot control stick causes equal angular displacement of both said first and second levers and wherein further said first and second levers and said linkage means are constructed and arranged so that in the event of a jam in one path of said dual path control system the lever coupled to the unjammed path of the control system will rotate about said axis independently of the lever coupled to the jammed path of said control system.

3. The improvement of claim 1 wherein said feel unit includes:
   a cylinder body having a bore formed therein;
   a wall mounted within said bore separating said bore into a first hydraulic chamber and a second hydraulic chamber, said first hydraulic chamber having a first inlet and said second hydraulic chamber having a second inlet;
   a source of pressurized fluid coupled to said first and second inlets, the pressure of said pressurized fluid being representative of the aerodynamic forces acting on the control surfaces of the aircraft;
   a first piston slidably mounted within said first hydraulic chamber;
   a second piston slidably mounted within said second hydraulic chamber;
   first coupling means coupling said first piston to said first lever;
   second coupling means coupling said second piston to said second lever; and,
   a pivot pin oriented along said pivot axis, each of said first and second levers being rotatably mounted on said pivot pin.

* * * * *